March 31, 1953  L. WALLERSTEIN, JR  2,633,155

PUMP DIAPHRAGM

Filed Feb. 7, 1947

Inventor

Leon Wallerstein Jr

By Ralph Hammer

Attorney

UNITED STATES PATENT OFFICE 2,633,155

PUMP DIAPHRAGM

Leon Wallerstein, Jr., Erie, Pa., assignor to Lord Manufacturing Company, Erie, Pa., a corporation of Pennsylvania Application February 7, 1947, Serial No. 727,207

7 Claims. (Cl. 137—796)

In diaphragm pumps having diaphragms of rubber like material there is a tendency to low pumping capacity at high pressures by distortion of the diaphragm. This invention is intended to prevent this loss of capacity by a diaphragm in which the flexing sections are back to back and reenforce each other on the pressure stroke. A further advantage is the increased resistance to rupture. Further objects and advantages appear in the specification and claims.

Figure 1:
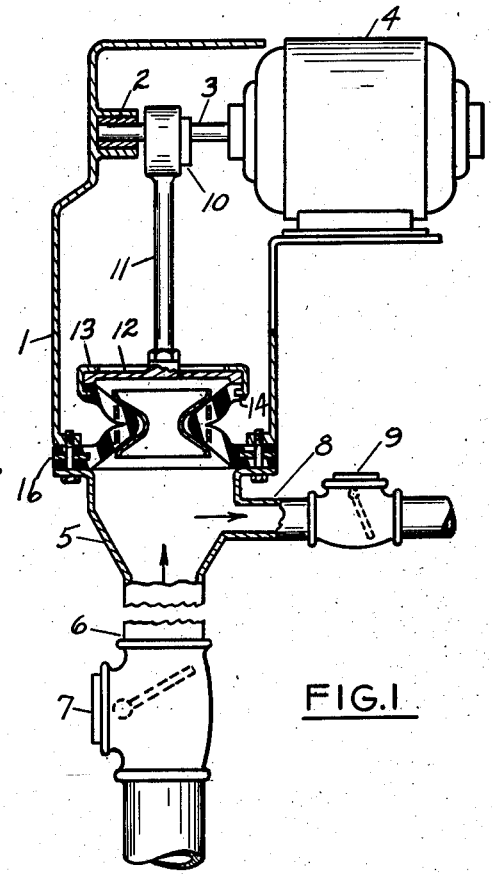
Figure 2:
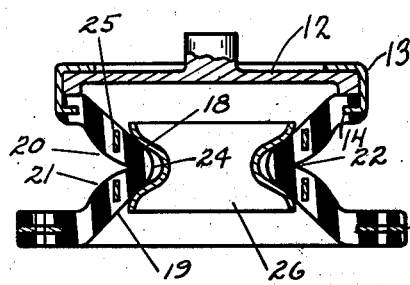
Figure 3:
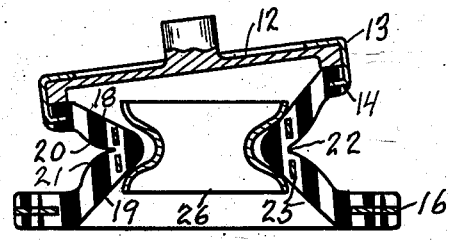
Figure 4:
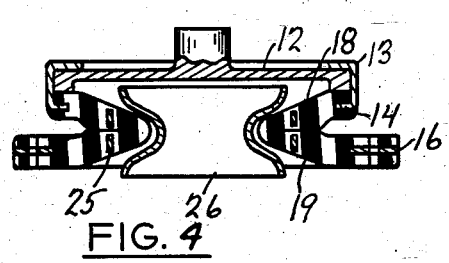
Figure 5:
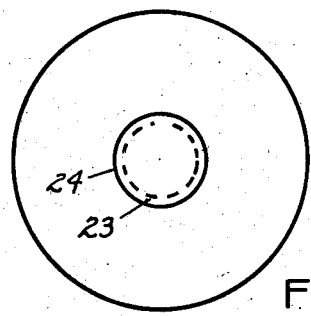

In the drawing Fig. 1 is a sectional elevation of a pump, Figs. 2, 3, and 4 are sectional views through the pump diaphragm showing the successive positions assumed during one stroke, and Fig. 5 is a plan view of the diaphragm.

In the drawing 1 indicating a pump casing having at its upper end an outboard bearing 2 for the shaft 3 of a driving motor 4 and at its lower end a cylinder head 5 carrying a drop pipe 6 provided with a check valve 7 and a discharge pipe 8 provided with a check valve 9. The cylinder head with the drop and discharge pipes comprises the pumping chamber. This arrangement may be used for shallow or deep well pumps. On the motor shaft 3 is an eccentric 10 for a connecting rod 11 having its lower end fixed to a piston head 12. The outer rim of the piston head is fixed to a metal ring 13 having an inturned flange 14 embedded in and bonded to the upper end of an annular diaphragm of rubber or like resilient material. At the lower end of the diaphragm is embedded a metal ring 16 also bonded to the rubber which is clamped between the pump casing 1 and the cylinder head 5. By having the connections to the ends of the diaphragm made through metal ring connectors bonded to the rubber the possibility of chafing by localized flexing at the ends of the diaphragm is minimized. Intermediate each end of the diaphragm are flexing sections 18 and 19 having adjacent surfaces 20 and 21 converging toward the center of the diaphragm and meeting at a sharp point 22. The adjacent surfaces 20 and 21 are so proportioned that as the ends of the diaphragm are moved together on the compression stroke of the pump the surfaces engage progressively from the center toward the ends. The progressive engagement is due in part to the convex surfaces 20 and 21 and in part to the progressive increase in wall thickness out from the center so that under the squeezing force from the piston and the water pressure, the surfaces on each side of the point 22 progressively engage. As indicated in Figs. 2 to 4 inclusive, the progressive engagement amounts to a rolling of the adjacent surfaces upon each other which is the result of shear deflection of the flexing sections 18, 19. Shear deflection, in which the rubber in the flexing sections is displaced axially, is at right angles to tension or compression which act directly along the length of the sections. This increases the rupture strength of the diaphragm. Another advantage of this construction is that as the diaphragm moves toward the end of the pressure stroke illustrated in Fig. 4 the flexing sections 18 and 19 of the diaphragm move closely together and assume a position offering greater resistance to radial expansion under pressure. In fact, the compression forces on the diaphragm tends to move the rubber inward as indicated by the dotted line 23 in Fig. 5, showing the constriction of the central opening 24 at the end of the pressure stroke. The diaphragm also is well adapted to accommodate the angularity of the connecting rod 11 without causing localized stress. This results from the progressive contact of the adjacent surfaces 20 and 21.

To further increase the resistance to flexure of the diaphragm under hydraulic pressure, metal rings 25 may be embedded in the sections 18 and 19 to resist outward expansion on the pressure stroke and a floating metal ring 26 may be carried on the inner surface of the opening 24. The rings 25 do not interfere with the shear deflection of the rubber which is in the direction of the axis of the rings, but the rings do increase the resistance of the rubber to bursting. The ring 26 resists inward flexure of the sections 18 and 19 on the suction stroke. The indicated clearance between the inner surfaces of the flexing sections and the ring 26 is such that the ring does not interfere with the normal action of the diaphragm.

What I claim as new is:

1. In a positive displacement pump of the type in which the pumping action is obtained by flexing a diaphragm, an annular diaphragm of rubber like material having ends axially spaced apart and flexing sections converging radially inward toward the center, adjacent surfaces of the flexing sections bottoming progressively from the center toward the ends upon axial movement of the ends of the diaphragm toward each other and a floating annular stiffening member having portions straddling the junction of the flexing sections and engaging the inner surfaces of the flexing sections in the extended position of the diaphragm to prevent inward bulging.

2. In a positive displacement pump of the type in which the pumping action is obtained by flexing a diaphragm, an annular diaphragm of rubber like material having ends axially spaced apart and flexing sections converging radially inward toward the center, adjacent surfaces of the flexing sections bottoming progressively from the center toward the ends upon axial movement of the ends of the diaphragm toward each other.

3. In a positive displacement pump of the type in which the pumping action is obtained by flexing a diaphragm, an annular diaphragm having ends axially spaced apart and flexing sections converging radially inward from each end toward the center, the flexing sections being free to deflect axially in shear and having a thickness increasing out from the center whereby the adjacent surfaces of the flexing sections bottom progressively from the center toward the ends upon axial movement of the ends of the diaphragm toward each other.

4. In a positive displacement pump of the type in which the pumping action is obtained by flexing a diaphragm, an annular diaphragm having ends axially spaced apart and flexing sections converging radially inward from each end toward the center, the flexing sections being free to deflect axially in shear and having adjacent surfaces meeting at the center at a sharp angle and having a thickness increasing out from the center whereby the adjacent surfaces of the flexing sections bottom progressively from the center toward the ends upon axial movement of the ends of the diaphragm toward each other.

5. In a positive displacement pump of the type in which the pumping action is obtained by flexing a diaphragm, an annular diaphragm having ends axially spaced apart and flexing sections converging radially inward from each end toward the center, the flexing sections being free to deflect axially in shear and having adjacent convex surfaces meeting at the center at a sharp angle whereby the adjacent surfaces of the flexing sections bottom progressively from the center toward the ends upon axial movement of the ends of the diaphragm toward each other.

6. In a positive displacement pump of the type in which the pumping action is obtained by flexing a diaphragm, an annular diaphragm having ends axially spaced apart and flexing sections converging radially inward from each end toward the center, the flexing sections being free to deflect axially in shear and having a thickness increasing out from the center whereby the adjacent surfaces of the flexing sections bottom progressively from the center toward the ends upon axial movement of the ends of the diaphragm toward each other, and metal ring connectors bonded to the ends of the diaphragm.

7. In a positive displacement pump of the type in which the pumping action is obtained by flexing a diaphragm, an annular diaphragm having ends axially spaced apart and flexing sections converging radially inward from each end toward the center, the flexing sections being free to deflect axially in shear and having a thickness increasing out from the center whereby the adjacent surfaces of the flexing sections bottom progressively from the center toward the ends upon axial movement of the ends of the diaphragm toward each other, and stiffening rings embedded in intermediate portions of the flexing sections on each side of the center preventing radially outward movement of the flexing sections as the ends of the diaphragm are moved.

LEON WALLERSTEIN, JR.

REFERENCES CITED

The following references are of record in the file of this patent:

UNITED STATES PATENTS

| Number | Name | Date |
|---|---|---|
| 1,538,166 | Cass | May 19, 1925 |
| 1,668,669 | Caldwell | May 8, 1928 |
| 2,180,128 | Stancliffe | Nov. 14, 1939 |
| 2,324,173 | Porter | July 13, 1943 |
| 2,337,639 | Brummer | Dec. 28, 1943 |
| 2,341,556 | Joy | Feb. 15, 1944 |
| 2,372,302 | Swindin | Mar. 27, 1945 |

FOREIGN PATENTS

| Number | Country | Date |
|---|---|---|
| 10,656 | France | Aug. 25, 1909 |
| | (Addition to No. 373,865) | |
| 465,878 | Great Britain | May 14, 1937 |